(12) United States Patent
Mody et al.

(10) Patent No.: US 8,326,309 B2
(45) Date of Patent: Dec. 4, 2012

(54) RESOURCE ALLOCATION IN CO-EXISTENCE MODE

(75) Inventors: Apurva N. Mody, Lowell, MA (US); Ranga Reddy, Bridgewater, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 803 days.

(21) Appl. No.: 12/399,730

(22) Filed: Mar. 6, 2009

(65) Prior Publication Data

US 2010/0227622 A1     Sep. 9, 2010

(51) Int. Cl.
*H04W 72/00*     (2009.01)

(52) U.S. Cl. .................. 455/452.1; 455/450; 455/552.1; 370/310

(58) Field of Classification Search ............... 455/452.1, 455/450, 552.1; 370/310
See application file for complete search history.

(56) References Cited

U.S. PATENT DOCUMENTS

| | | | | |
|---|---|---|---|---|
| 6,510,318 | B1 * | 1/2003 | Minagawa ................. | 455/435.2 |
| 2006/0148482 | A1 * | 7/2006 | Mangold ..................... | 455/450 |
| 2008/0186939 | A1 * | 8/2008 | Kim et al. .................... | 370/343 |
| 2008/0214199 | A1 * | 9/2008 | Ji ................................ | 455/452.1 |
| 2008/0220791 | A1 * | 9/2008 | Cho et al. .................... | 455/450 |
| 2008/0291884 | A1 * | 11/2008 | Lee et al. .................... | 370/338 |
| 2008/0318585 | A1 * | 12/2008 | Kauser et al. ............... | 455/446 |
| 2009/0092066 | A1 * | 4/2009 | Chindapol et al. .......... | 370/277 |
| 2009/0103569 | A1 * | 4/2009 | Cho et al. .................... | 370/498 |
| 2009/0116427 | A1 * | 5/2009 | Marks et al. ................ | 370/328 |
| 2009/0185632 | A1 * | 7/2009 | Cai et al. ..................... | 375/260 |
| 2009/0219904 | A1 * | 9/2009 | Khairmode et al. ......... | 370/338 |
| 2010/0020732 | A1 * | 1/2010 | Gaddam et al. ............. | 370/310 |
| 2010/0202401 | A1 * | 8/2010 | Hwang et al. ............... | 370/330 |
| 2010/0214992 | A1 * | 8/2010 | Hart et al. ................... | 370/329 |
| 2011/0032853 | A1 * | 2/2011 | Moon et al. ................. | 370/280 |

OTHER PUBLICATIONS

Goldhammer, 802.16h Main Concepts, IEEE 802.19-05/0051r0, Nov. 15, 2005, 43 pages.
Chouinard, Coexistence Capacity Allocation Methods, IEEE 802.22-08/0099r0, Mar. 5, 2008, 11 pages.
Reddy, et al., DL/UL Resource Allocation for Improved Intra-system Coexistence; IEEE C802.16m-08/200r1, Mar. 17, 2008, 9 pages.
Chouinard, Coexistence Capacity Allocation Method, IEEE 802.22-08/0085r0, Mar. 5, 2008, 8 pages.
Haykin, Cognitive Radio: Brain-Empowered Wireless Communications, IEEE Journal on Selected Areas in Communications, vol. 23, No. 2, Feb. 2005, 20 pages.

(Continued)

*Primary Examiner* — Meless N Zewdu
*Assistant Examiner* — Qun Shen
(74) *Attorney, Agent, or Firm* — Finch & Maloney PLLC; Neil F. Maloney

(57) ABSTRACT

Techniques are disclosed that allow for resource allocation during situations requiring co-existence in cognitive radios. Even under situations of bandwidth scarcity, the techniques allow various users to be guaranteed quality of service (QoS) by proper distribution and allocation of resources. The techniques allow wireless communication systems to operate in a normal mode and a co-existence mode. In the co-existence mode of operation, sub-frame creation, sharing and zone formation schemes are implemented that enable the existing underlying frame structure to remain intact and inter-operable with the legacy systems and at the same time, provide a guaranteed QoS. The zones effectively create partitions in space, time and frequency, which result in interference avoidance and allow various users in neighboring cells to communicate on the same frequencies.

19 Claims, 12 Drawing Sheets

OTHER PUBLICATIONS

Cordiero, et al., IEEE 802.22: An Introduction to the First Wireless Standard based on Cognitive Radios, Journal of Communications, vol. 1, No. 1, Apr. 2006, 10 pages.

Mody, et al., Recent Advances in Cognitive Communications, IEEE Communications Magazine, Oct. 2007, 8 pages.

Mody, et al., Resource Allocation in 802.22 for Improved Self Co-Existence, IEEE P802.22 Wireless RANSs, IEEE 802.22-08/0092r0, Mar. 9, 2008, 18 pages.

Mody, et al., Machine Learning Based Cognitive Communications in White as well as the Gray Space, 2007, 7 pages.

Chouinard, IEEE P802.22 Wireless RANs, Draft Minutes of the Orlando Plenary Session of 802.22, Mar. 21, 2008, 31 pages.

Mitola, et al, Cognitive Radio: Making Software Radios More Personal, IEEE Personal Communications, Aug. 1999, 6 pages.

Mitola, Cognitive Radio An Integrated Agent Architecture for Software Defined Radio, May 8, 2000, 313 pages.

Mobile WiMAX—Part 1: A Technical Overview and Performance Evaluation, Apr. 2006, 53 pages.

Mody, et al., Resource Allocation in 802.22 for Improved Self Co-Existence, IEEE P802.22 Wireless RANs, May 9, 2008, 23 pages.

Mody, et al., Text on Resource Allocation in 802.22 for Improved Self Co-Existence, IEEE P802.22 Wireless RANs, May 6, 2008, 7 pages.

Akyildiz, et al., NeXt Generation/Dynamic Spectrum Access/Cognitive Radio Wireless Networks: A Survey, Computer Networks 50 (2006), 33 pages.

Reddy, et al., Optimization of DL/UL Resource Allocation Configuration for Improved Interference Mitigation; IEEE C802.16m-08/678r4, Jul. 16, 2008, 5 pages.

Part 16: Air Interface for Fixed and Mobile Broadband Wireless Access Systems, Draft Amendment to IEEE Standard for Local and Metropolitan Area Networks, IEEE P802.16h/D3, Oct 2007, 198 pages.

Sherman, et al., IEEE Standards Supporting Cognitive Radio and Networks, Dynamic Spectrum Access, and Coexistence, IEEE Communications Magazine, Jul. 2008, 8 pages.

Mody, et al., Resource Allocation in 802.22 for Improved Self Co-Existence, IEEE P802.22 Wireless RANSs, IEEE 802.22-08/0092r1, Mar. 9, 2008, 18 pages.

McHenry, et al., XG Dynamic Spectrum Access Field Test Results, IEEE Communications Magazine, Jun. 2007, 7 pages.

Cavalcanti, et al., Cognitive Radio Networks: Enabling New Wireless Broadband Opportunities, 3rd International Conference on Cognitive Radio Oriented Wireless Networks and Communications 2008, Available on May 15, 2008, 6 pages.

Sengupta, et al., Enhancements to Cognitive Radio Based IEEE 802.22 on Air-Interface, IEEE international Conference on Communications 2007, Available on Jun. 24, 2007, 6 pages.

Sengupta, et al., A Game Theoretic Framework for Distributed Self-Coexistence Among IEEE 802.22 Networks, IEEE Global Telecommunications Conference 2008, Available on Nov. 30, 2008, 6 pages.

* cited by examiner

RESOURCE ALLOCATION IN CO-EXISTENCE MODE

FIELD OF THE INVENTION

The invention relates to communication systems, and more particularly, to resource allocation in cognitive communications systems.

BACKGROUND OF THE INVENTION

Wireless communications systems of the future are likely to be driven by increasing usage of diverse bandwidth-hungry applications which require streaming voice, video and data on devices such as smart phones, handhelds and portable devices. Advances in signal processing, source coding, digital communications have allowed voice and video to be compressed and packaged as data. Multiple-Input and Multiple-Output (MIMO) systems, Advanced Antenna Systems (AAS), Multi-User Detection (MUD), and channel coding techniques such as Turbo and Low Density Parity Check (LDPC) codes have pushed system throughputs toward the information theoretical limit (the Shannon Capacity). However, even though such systems and smart signal processing techniques allow for more efficient information transmission schemes, a fundamental bottleneck remains. That bottleneck is access to the RF spectrum.

In more detail, it is generally believed that there is ample RF spectrum available to meet the global demand for voice, video and data. For instance, based on measurements of the average spectrum usage in multiple different markets, it has been found that more than 80% of the available spectrum is under-utilized. Most of the current spectrum has been allocated using a command and control licensing structure where a few selected entities are in charge of large swaths of spectrum, many of which are underutilized. The most relevant example is that of broadcast television (TV) spectrum where signals are normally transmitted over the air at VHF and UHF frequencies. In rural markets TV channels often go unused due to limited demand. In urban markets, the majority of people have started receiving their TV transmission either using cable or optical fiber. Many countries are making transition towards Digital TV (DTV) where signals occupy much smaller bandwidths as compared to their analog counterparts. These factors lead to large and increasing amounts of spectrum that are allocated to broadcast services, but are locally unused. This vacant spectrum may be opportunistically accessed to transmit broadband data in case it can be established that such a use causes no harmful interference to the allocated (incumbent) broadcast services.

Technology already exists to allow opportunistic usage of RF spectrum. Such opportunistic use of spectrum is often called Dynamic Spectrum Access (DSA). Programs such as the neXt Generation (XG) Communications have proven that DSA techniques can allow access to channels allocated to incumbent users without harmful interference to the incumbent. The concept of cognitive radio also seems to be feasible. Cognitive radios are defined as radios that are capable of sensing their surrounding environment and altering their transmission parameters to more optimally utilize the existing resources, such as RF spectrum, to meet current user needs. Some have even proposed combining DSA techniques with machine learning techniques to make better usage of the system resources while avoiding interference.

The future points to multitudes of such DSA enabled cognitive radio devices using a variety of different waveforms and protocols, co-existing, in cognitive networks to make the best possible use of the available spectrum. The word co-existence here is of importance since competing technologies will result in different types of waveforms and protocols being employed for various types of services. These diverse waveforms and protocols will need to share spectral resources without harming each other, hence the need for co-existence. Some of the Institute of Electrical and Electronics Engineers (IEEE) Standards working groups such as IEEE 802.15.2 have defined the term co-existence as the "ability of one system to perform a task in a given shared environment where other systems have an ability to perform their tasks and may or may not be using the same set of rules."

The IEEE 802.22 standard is directed to wireless regional area networks (WRANs) that use white spaces (unused bandwidth) in the television broadcasting bands without interfering with other users. The standard is largely based on concepts underpinning the cognitive radio, which include spectrum sensing and management as well as spectrum mobility and sharing. Spectrum sensing and management generally involve the detection of the best spectrum to meet user quality of service (QoS) requirements and using it without harmful interference to other users. Spectrum mobility and sharing allow for maintaining seamless communications when transitioning from one spectrum to another (e.g., dynamic frequency selection, frequency hopping, etc), and strive for fairness in spectrum allocation (e.g., equal access).

To this end, cognitive radios and networks sharing common bandwidth have to effectively self-coexist with one another by accessing different parts of the available spectrum in an evenly or otherwise fairly distributed manner. Executing such self-coexistence is not trivial, and there are currently no available methods for resource allocation during situations requiring co-existence in cognitive radios. Moreover, conventional co-existence techniques require changes in the concept of communication system operation, thereby resulting in legacy systems not being inter-operable with systems requiring co-existence.

There is a need, therefore, for techniques that allow for resource allocation during situations requiring co-existence in cognitive radios.

SUMMARY OF THE INVENTION

One embodiment of the present invention provides a wireless communications system. The system includes a first base station for wirelessly communicating with one or more subscribers over a channel. The first base station is configured to operate in a normal mode and a co-existence mode. In response to entering the co-existence mode due to a second base station requesting access to the channel, the first base station is for transmitting a frame including first and second downstream (DS) sub-frames, an upstream (US) sub-frame, and a self-coexistence window. During the co-existence mode, the first base station communicates with its subscribers using the first DS sub-frame, thereby allowing the second base station to communicate with its subscribers using the second DS sub-frame.

In one specific embodiment, each of the DS sub-frames includes a preamble, control information, DS and US maps, and data. In another specific embodiment, the first base station defines a cell within which its subscribers are located, and the first base station is further configured for establishing zones within that cell based on geographic location of those subscribers, such that each subscriber is assigned to a zone. In one such embodiment, the first base station uses the geographic location of those subscribers to perform time slot and sub-channel allocation so as to divide the working area of the cell into the zones. In another specific embodiment, in the co-existence mode, channel bandwidth and frame structure is divided into zones of space, time and sub-channels. In one such specific embodiment, the zones may rotate in accordance with a clockwise or counter-clockwise rotation policy, so as to achieve diversity and/or control message passing. In another such specific embodiment, zone formation is used to assist mobility of a subscriber from one cell to another resulting in a hand-over process (such as when a mobile user is traveling from one geographic region covered by cell A to another geographic region covered by cell B).

In another specific embodiment, the system further includes the second base station. In one such embodiment, the second base station is for wirelessly communicating with its subscribers over the channel, and is configured to operate in the normal mode and the co-existence mode. In response to entering the co-existence mode due to the first base station requesting access to the channel, the second base station is for transmitting a frame including first and second DS sub-frames, an US sub-frame, and a self-coexistence window. During the co-existence mode, the second base station communicates with its subscribers using the second DS sub-frame, and the first base station communicates with its subscribers using the first DS sub-frame. In another such embodiment, before sending the second DS sub-frame, the second base station decodes DS and US maps originating from the first base station and sends out its own DS sub-frame including preamble, DS and US maps, control information and zone data, which may or may not coincide with those of the first base station.

In some embodiments, each subscriber associated with the first and second base stations can transmit its US sub-frame at the same time. In some embodiments, the system initially attempts to resolve channel selection issues with neighboring base stations based on spectrum etiquette during the normal mode. In response to channel selection not being resolved using spectrum etiquette, then the system may enter the co-existence mode of operation. The co-existence mode can be utilized, for example, when one or more of interference free scheduling, dynamic resource renting and offering, or contention is required for resource sharing.

The system may further include a third base station, wherein the third base station is a legacy base station not configured for transmitting a frame including first and second DS sub-frames. Given the transparency of the techniques described herein, the legacy base station will still operate in the system.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

Figure 1:
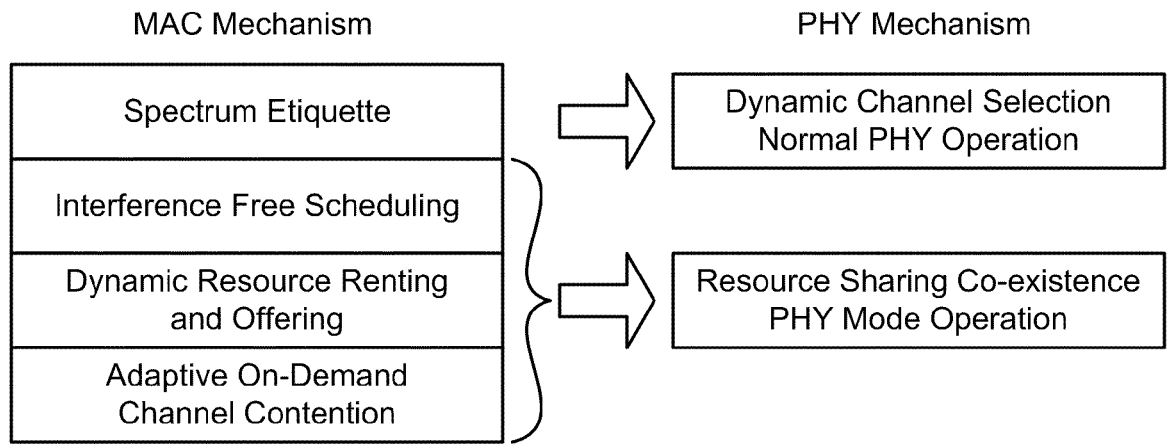
FIG. 1 illustrates MAC and PHY mechanisms during normal and co-existence modes of operation, in accordance with an embodiment of the present invention.

Techniques are disclosed that allow for resource allocation during situations requiring co-existence in cognitive radios. Even under situations of bandwidth scarcity, the techniques allow various users to be guaranteed quality of service (QoS) by proper distribution and allocation of resources. The techniques allow legacy wireless communication systems to operate in a normal mode and a co-existence mode. In the co-existence mode of operation, sub-frame creation, sharing and zone formation schemes are implemented that enable the existing underlying frame structure to remain intact and inter-operable with the legacy systems and at the same time, provide a guaranteed QoS. The zones effectively create partitions in space, time and frequency, which result in interference avoidance and allow various users in neighboring cells to communicate on the same frequencies.

General Overview

The self-coexistence techniques described herein can be embodied, for example, in an 802.22 compliant wireless communications system having a number of cognitive radios. As is known, IEEE 802.22 is a commercial standard that proposes the use of cognitive radio based techniques for utilizing TV broadcasting bands for broadband communications. Other suitable standards that can benefit from the techniques described herein will be apparent in light of this disclosure.

In general, channel as used herein refers to an allocation in the RF spectrum that is used for communications or transfer of information. A base station (BS) acts as a central node of a cell to which one or more subscribers can connect in order to obtain service. A cell generally refers to an area or region where the BS can reliably provide the service. For the sake of simplicity, a cell is assumed to be elliptical in this disclosure, although a cell may assume any shape based on the factors such a terrain, temperature, frequency of operation etc, as will be appreciated. The techniques described herein are not intended to be limited by cell shape. A subscriber generally refers to a client node that is capable, for instance, of requesting a service from the BS. A subscriber can also act as a relay node to act as a bridge between two neighboring cells. A wireless communications system may include, for example, one or more base stations. Each base station may have a number of subscribers. Reference to a cell accessing a channel generally refers to mechanisms such as spectrum sensing by way of which an entity within that cell (such as a BS) decides to utilize that channel for its operation. As previously explained, cognitive radios are capable of sensing their surrounding environment and altering their transmission parameters to more optimally utilize the existing resources, such as RF spectrum, to meet current user needs. A cognitive radio system generally needs to co-exist with primary users of the system, where the primary users or so-called incumbents are essentially occupiers of the spectrum. In this sense, a cognitive radio system may be considered a secondary system, and if it during its use of a channel it detects the presence of a primary system, then that cognitive radio system must vacate that channel.

Each cognitive radio in a system can be configured with two modes of operation: normal mode and co-existence mode. Legacy radios of the system need not be reconfigured to be operational in either mode, as will be explained in turn. Normal mode of operation can be chosen, for example, when the number of channels available is greater than or equal to the number of neighboring cells trying to access them at the same time. In such cases, the neighboring cells may exchange tables of their channel choices and decide to choose a channel of operation based on some form of spectrum etiquette. Co-existence mode of operation generally refers to situations when the number of channels available is less than the number of cells trying to access them. In such cases, some of the cells may need to share a channel with other neighboring cells. The techniques described herein enable resource allocation in situations that require co-existence where resources such as time slots and frequency slots are distributed spatially in order to meet the QoS requirements.

In operation, a wireless communication system (e.g., IEEE 802.22 system) configured in accordance with an embodiment of the present invention initially attempts to resolve channel selection issues with neighboring cells based on spectrum etiquette. If channel selection cannot be resolved using spectrum etiquette, then the wireless communication system enters a co-existence mode of operation. The co-existence mode can be utilized, for example, when interference free scheduling, dynamic resource renting and offering, or contention is required for resource sharing. In addition, sub-frame creation and sharing and zone formation are employed to allocate resources and provide QoS in co-existence situations.

In more detail, in the co-existence mode, cell bandwidth and frame structure is divided into logical sectors or zones of space, time and sub-channels. The logical sectors/zones may rotate in accordance with a clockwise or counter-clockwise rotation policy, so as to achieve diversity and/or control message passing. In special cases, where base stations can decode the neighboring cell information, downstream and upstream slots or sets can be utilized to periodically exchange control information. Using sub-frames for resource allocation as described herein allows desired QoS, as well as delay and jitter requirements in situations that call for co-existence. In the co-existence mode of operation, the sub-frame creation and sharing schemes enable the existing underlying frame structure to remain intact and inter-operable with any legacy systems. Applications that can benefit from such resource allocation techniques include, for example, VoIP and gaming applications.

The sub-frame creation and sharing and zone formation techniques employed to allocate resources and provide QoS in co-existence situations as described herein can be implemented, for example, using software, firmware, hardware, or some combination thereof. In one particular embodiment, the techniques are implemented by a set of instructions (software or executing on a processor included in the base station, customer premises equipment, or other suitable device where it is desirable to utilize existing frame structures as described herein. Alternatively, the techniques can be implemented with purpose built logic (e.g., FPGA or ASIC) or a microcontroller having input/output capability and a number of embedded routines for carrying out the functionality described herein. Any number of implementations can be employed, as will be appreciated in light of this disclosure.

MAC and PHY Layer Mechanisms in the Co-Existence Mode

Currently, the IEEE 802.22 standard proposes two medium access control (MAC) mechanisms for situations that demand co-existence. These mechanisms are spectrum etiquette and adaptive on-demand channel contention. More specifically, MAC as well as Physical (PHY) Layer mechanisms exist for spectrum etiquette. Also, MAC mechanisms exist for adaptive on-demand channel contention. However, PHY mechanisms have not yet been defined for co-existence. In addition, there are currently no techniques for resource allocation during situations that require co-existence. More over, in addition to spectrum etiquette and adaptive on-demand channel contention, there are other MAC mechanisms that have been proposed such as interference free scheduling and dynamic resource renting and offering. The techniques described herein may be used for resource allocation at the PHY Layer for any of these MAC mechanisms for situations that demand co-existence (e.g., interference free scheduling, dynamic resource renting and offering, contention, etc).

In accordance with an embodiment of the present invention, IEEE 802.22 systems initially attempt to resolve the channel selection issues with neighboring WRAN systems based on spectrum etiquette. If channel selection does not get resolved using spectrum etiquette, then the 802.22 system transitions into the co-existence mode for resource allocation. As can be seen with reference to the example of FIG. 1, the MAC Layer mechanisms in the co-existence mode include one or more of the following mechanisms: interference free scheduling, dynamic resource renting and offering, or adaptive on-demand contention. In addition, the PHY Layer mechanism for resource allocation in the co-existence mode can be carried out using sub-frame and zone creation and sharing, with sub-frames and zones being shared between neighboring cells which wish to co-exist.

In the co-existence mode, the sub-frames are divided into zones. Clockwise or counter-clockwise rotation policy can be followed to achieve diversity and/or control message passing, as will be explained in turn. In addition to sub-frames, the self co-existence window (or windows) of each 802.22 frame can be utilized to pass management information. Information may be exchanged with other cells using downstream (DS) and upstream (US) slots/sets in cases where propagation characteristics are favorable, thereby enabling self co-existence windows to be utilized more effectively for intra-frame sensing of incumbents and WRANs.

Figure 2:
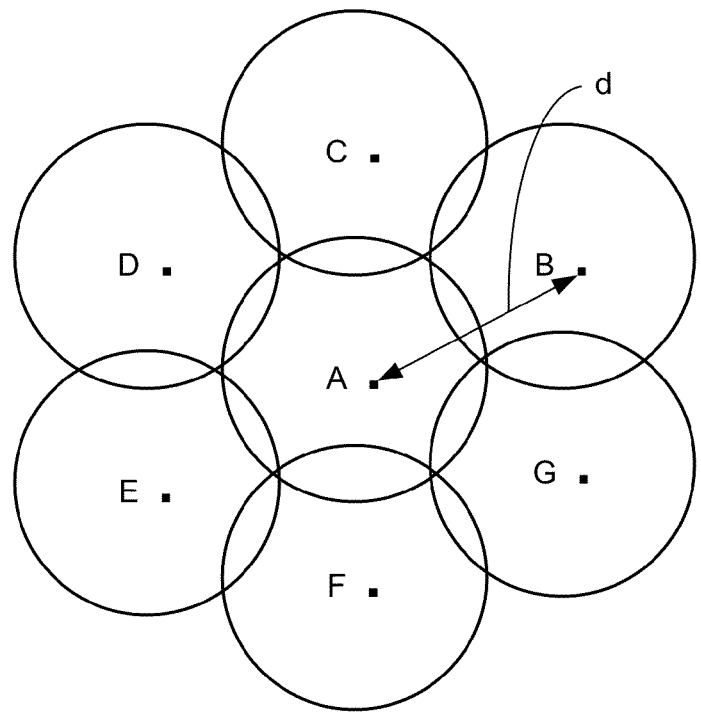
FIG. 2 illustrates a simplified case when co-existence is necessary.

FIG. 2 shows a simplified case, when co-existence is necessary in a WRAN system. In this example, there are a number of incumbent base stations (BSs), including $BS_B$ through BS$_G$. BS$_A$ is a new base station, which is at a distance d (e.g., 60 kilometers) away from incumbent BS$_B$. In general, co-existence is necessary when a base station cannot use any other channel except for one of the channels being currently used by one of its neighboring base stations. In this particular example scenario, which shows a first tier of neighbors, BS$_A$ cannot find any channels unoccupied by the primary users (incumbents), or neighboring WRANs. Other scenarios may be more complex, and included multiple tiers of neighbors.

In any such case, a simplified link analysis shows the need for coexistence. For instance, a simplified link analysis for signals from the first tier neighbor base stations A and B is shown here: $P_{RxA}=P_{TxB}+G_{TxB}-L_{TxB}-L_{FS}-L_M+G_{RxA}-L_{RxA}$, where $P_{RxA}$=Received Power at A;
$P_{TxB}$=Transmit power from B=4 W=36 dBm;
$G_{TxB}$=Antenna Gain B=0 dB;
$L_{TxB}$=Transmitter losses=0 dB;
$F_c$=Carrier frequency=617 MHz→Corresponding to the Channel 38;
$\lambda$=Wavelength=$(3\times10^8)/(617\times10^6)$=0.48622 m;
$L_{FS}$Free space loss=$20*\log_{10}(4\pi d/\lambda)$;
=$20*\log_{10}(4\pi\ 60,000/0.48622)$;
=123.81 dB, where d=distance from A to B (e.g., assume 60 km);
$L_M$Miscellaneous losses=0 dB;
$G_{RxA}$=Receiver (A) antenna gain=0 dB; and
$L_{RxA}$=Receiver losses at A=0 dB.

Based on the calculation for $P_{RxA}$, $P_{RxA}$=−87.81 dBm. Assuming the Noise Figure NF=11 dB, then Noise Power (dBm)=$P_N$=$10*\log_{10}(k*T*B/(1\times10^{-3}))$+11 dB, which equals $10*\log_{10}(1.38\times10^{-23}*290*6\times10^6/(1\times10^{-3}))$+11 dB, which equals −95.19 dB. Hence the signal-to-noise ratio (SNR) at base station A for the signal transmitted from base station B can be computed by: $SNR_{B\to A}$=−87.81−(−95.19)=7.38 dB. Thus, 7.38 dB of SNR for the link is sufficient for base station A to detect and decode information from base station B.

Co-Existence Message Flow

Figure 3A:
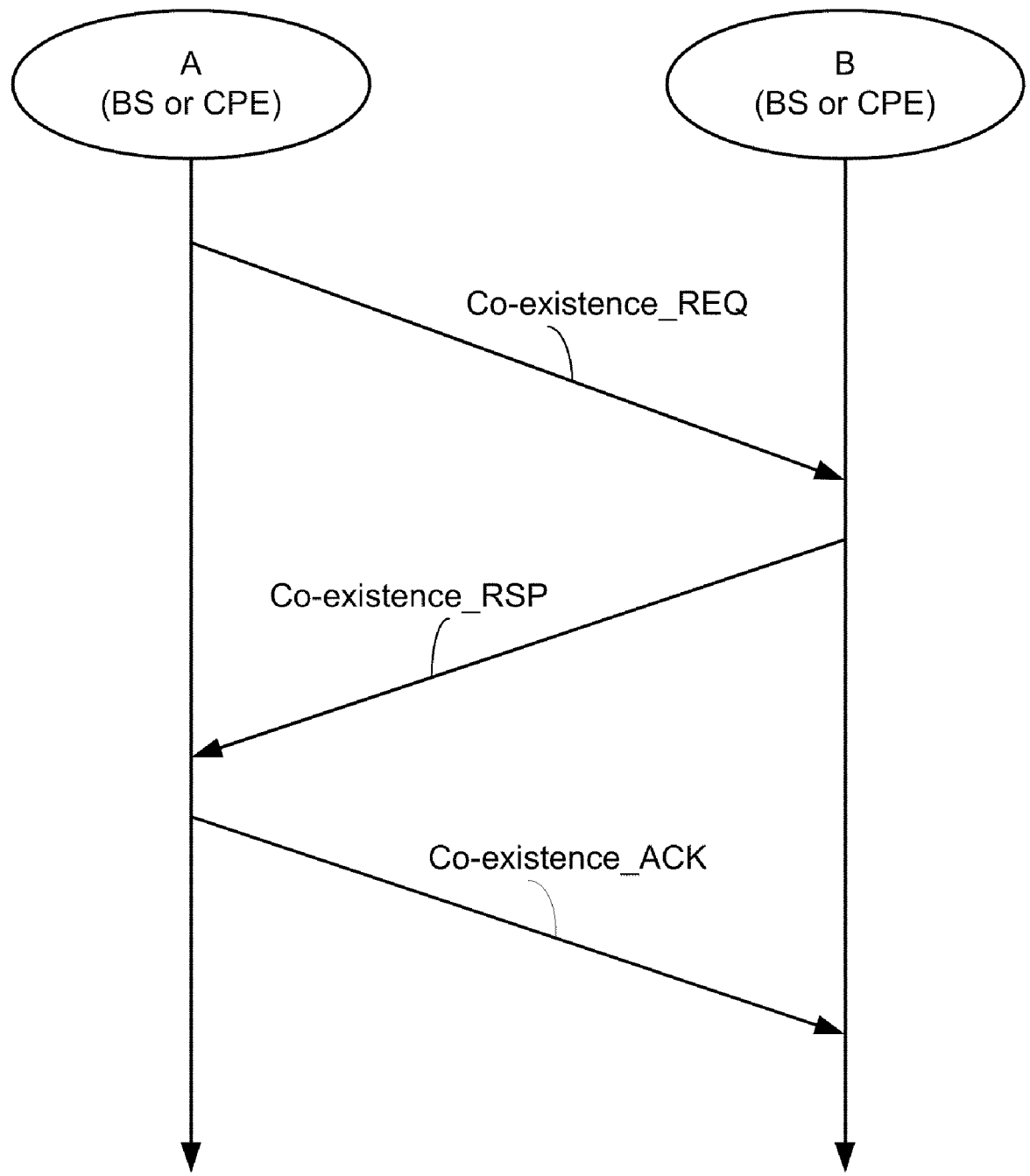
FIGS. 3a and 3b illustrate a co-existence request and response mechanism, in accordance with an embodiment of the present invention.
Figure 3B:
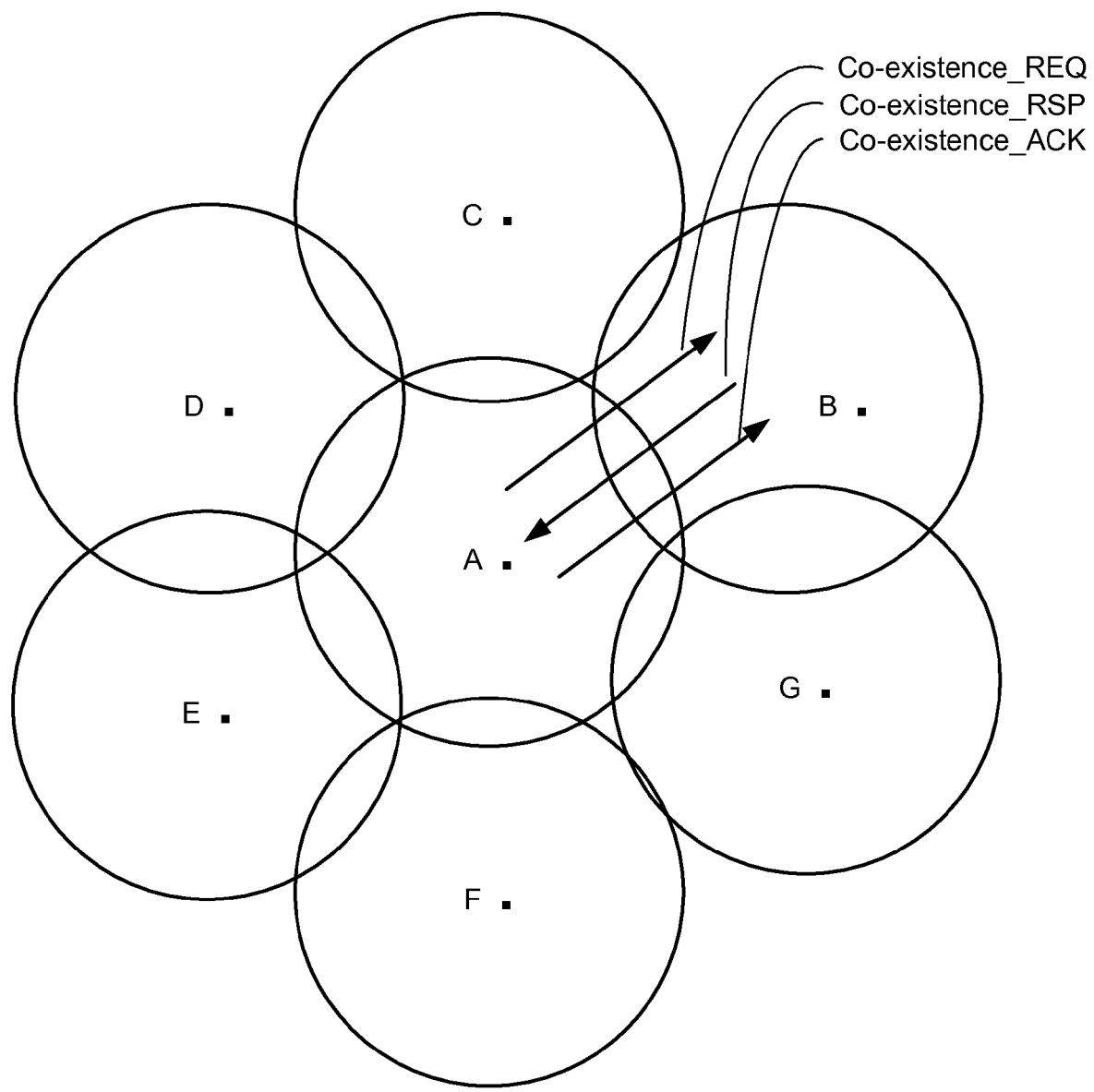

FIGS. 3a and 3b illustrate a co-existence request and response mechanism, in accordance with an embodiment of the present invention. As can be seen, this example co-existence message flow is carried out between two base station or customer premises equipment (CPE), generally referred to as cell A and cell B.

In the co-existence mode, cell A initiates the co-existence message flow, and requests to share the channel with cell B. Since cell B is the existing user of the given channel, cell A requests channel sharing with cell B using a Co_existence_REQ message. In response to the request from cell A, cell B agrees with (accepts) or disagrees with (rejects) the scheduling of a co-existence frame using a Co_existence_RSP message. Cell A then sends Co_existence_ACK message to acknowledge the receipt of the Co_existence_RSP message. Assuming that cell B accepts the channel sharing proposed by cell A, cell B can then schedule the co-existence frames in the subsequent super-frames, whose structure will be described in turn. The illustrated messaging scheme is just an example of how the resource sharing process may be initiated, and other messaging schemes may be employed. In general, the messaging scheme may include a two-way handshake (e.g., request and response) or a three-way handshake (e.g., request, response, acknowledgement), or any number of message exchanges that may involve security functions which ensure that the issued request is from an authentic source (e.g., BS or CPE) and not from a source that is trying to disrupt or slowdown an already existing communications network creating a Denial of Service (DoS) attack or other inappropriate behavior.

In one specific embodiment, each of these messages (Co_existence_REQ, Co_existence_RSP, and Co_existence_ACK messages) is sent using the co-existence beacon protocol (CBP). In other embodiments, the message can be sent using the backhaul or some other suitable messaging means. In any such cases, the messaging effectively allows co-existence frames to be subsequently scheduled, where sub-frames are shared between the cells which wish to co-exist. The sub-frames are divided into zones to achieve the desired resource allocation, as will now be explained with reference to FIGS. 4a through 8b.

Sub-Frame Creation/Sharing and Zone Formation

Figure 4A:
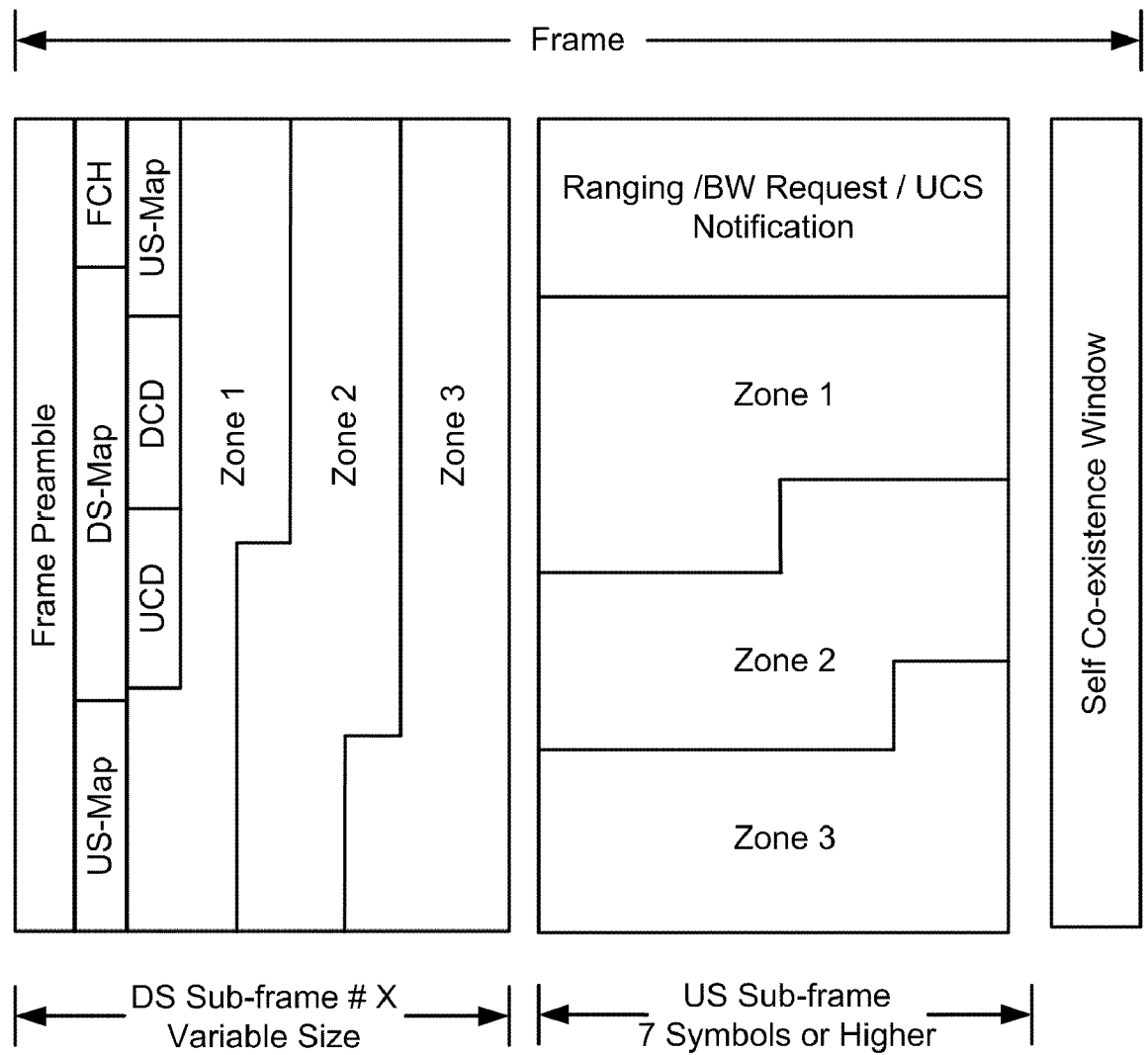
FIG. 4a illustrates a frame structure that accommodates sub-frame creation and sharing as well as zone formation in a frame-based WRAN for resource allocation during the co-existence mode, in accordance with an embodiment of the present invention.

FIG. 4a illustrates a frame structure that accommodates sub-frame creation and sharing in a frame-based WRAN for resource allocation during the co-existence mode, in accordance with an embodiment of the present invention. The frame structure can be compliant, for example, with the IEEE 802.22 standard.

As can be seen, the frame structure includes a downstream (DS) sub-frame, an upstream (US) sub-frame, and self-coexistence window. As typically done, a transmit/receive transition gap (TTG) can be used to provide a gap between the downlink burst and the subsequent uplink burst in a time-division duplexing (TDD) transceiver. In addition, a time buffer can be provided before and after the self-coexistence window, and a receive/transmit transition gap (RTG) after the self-coexistence window can be used to provide a gap between the uplink burst and the subsequent downlink burst in a TDD transceiver. Note that the example of a TDD system is just one illustration of how the techniques described herein may be applied, and that the techniques are equally applicable other methods of information transport, such as frequency division duplexing (FDD), as will be apparent in light of this disclosure. The techniques described herein may also readily apply to other types of waveforms, e.g. IEEE 802.16, 3G and 4G, LTE etc, as will be apparent.

Each DS sub-frame (generally designated DS sub-frame # X) of this example embodiment contains a Frame Preamble, frame control header (FCH), upstream and downstream maps (US-Maps and DS-Map), uplink and downlink channel descriptors (UCD and DCD), and zone data (for Zones 1, 2, and 3). The DS sub-frame information, including the zone data, is layered vertically and stepped horizontally in the time domain. The DS sub-frame size is variable depending upon various MAC Layer functionalities such as interference free scheduling, dynamic resource renting and offering, and adaptive on-demand channel contention. Each US sub-frame of this example embodiment contains zone data (for Zones 1, 2, and 3), as well as space for allocating resources for contention based access that can be used for ranging, bandwidth (BW) requests, and urgent coexistence situation (UCS) notification. The US sub-frame information of this example is mapped horizontally. The US sub-frame of this example includes 7 symbols or higher. Other such minimum data schemes can be used, depending on the minimum burst portion. Another mode is to lay the information to fill one column of 7 symbols at a time. As is known, orthogonal frequency-division multiplexing (OFDM), orthogonal frequency-division multiple access (OFDMA), or other suitable modulation scheme can be used. In addition, a number of symbols (e.g., up to 5 symbols) are reserved after the US sub-frame for the self-coexistence window, which can be used for co-existence beacon transmissions.

Figure 5:
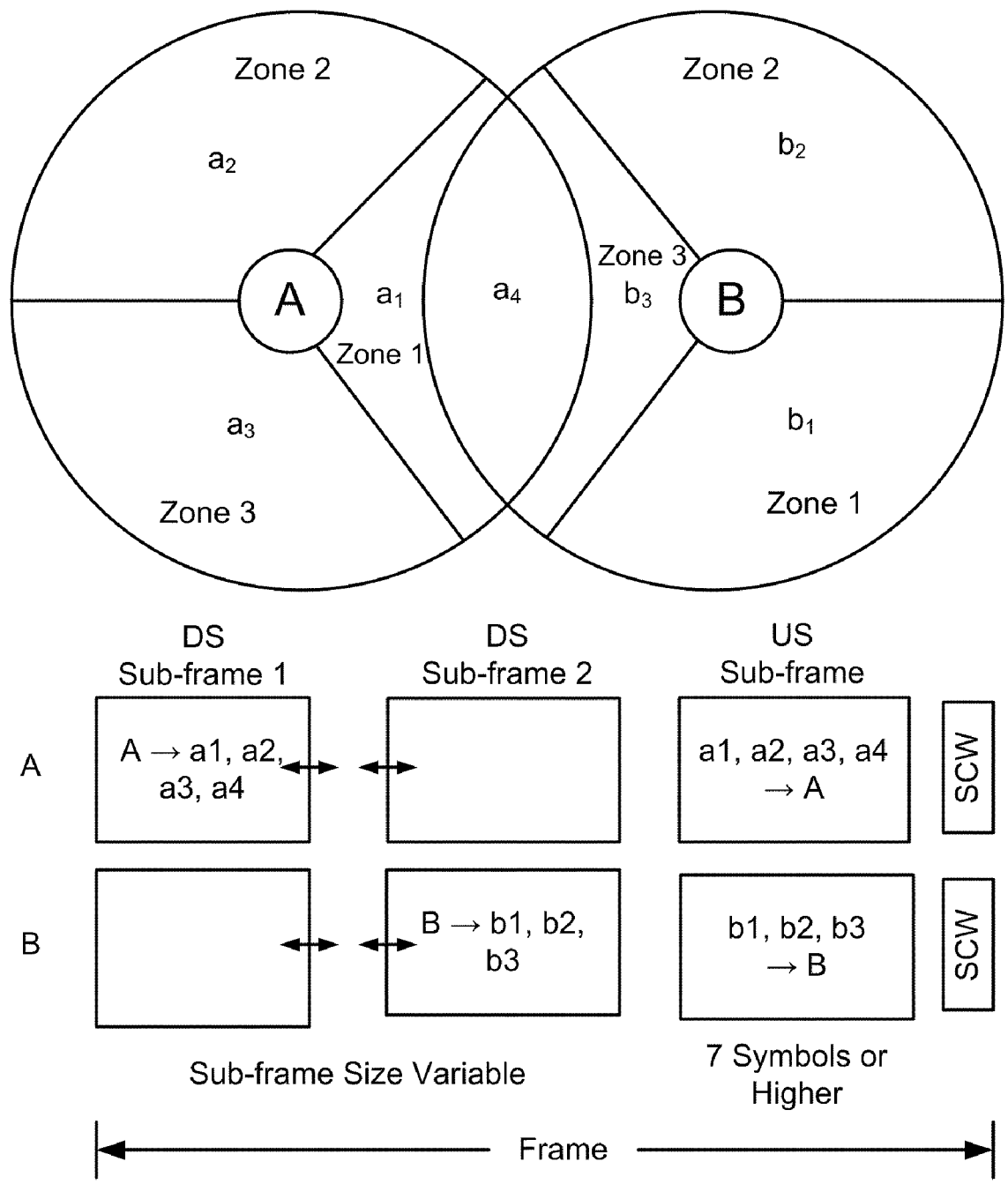
FIG. 5 illustrates an example of sub-frame creation/sharing and zone formation for co-existence between two cells, in accordance with an embodiment of the present invention.

FIG. 5 illustrates an example of sub-frame creation/sharing and zone formation to enable co-existence between two cells (base station A and cell B), in accordance with an embodiment of the present invention. Sub-frame creation keeps the underlying frame structure (IEEE 802.22 or other suitable frame structure) and receiver architecture intact while enabling resource allocation.

Figure 4B:
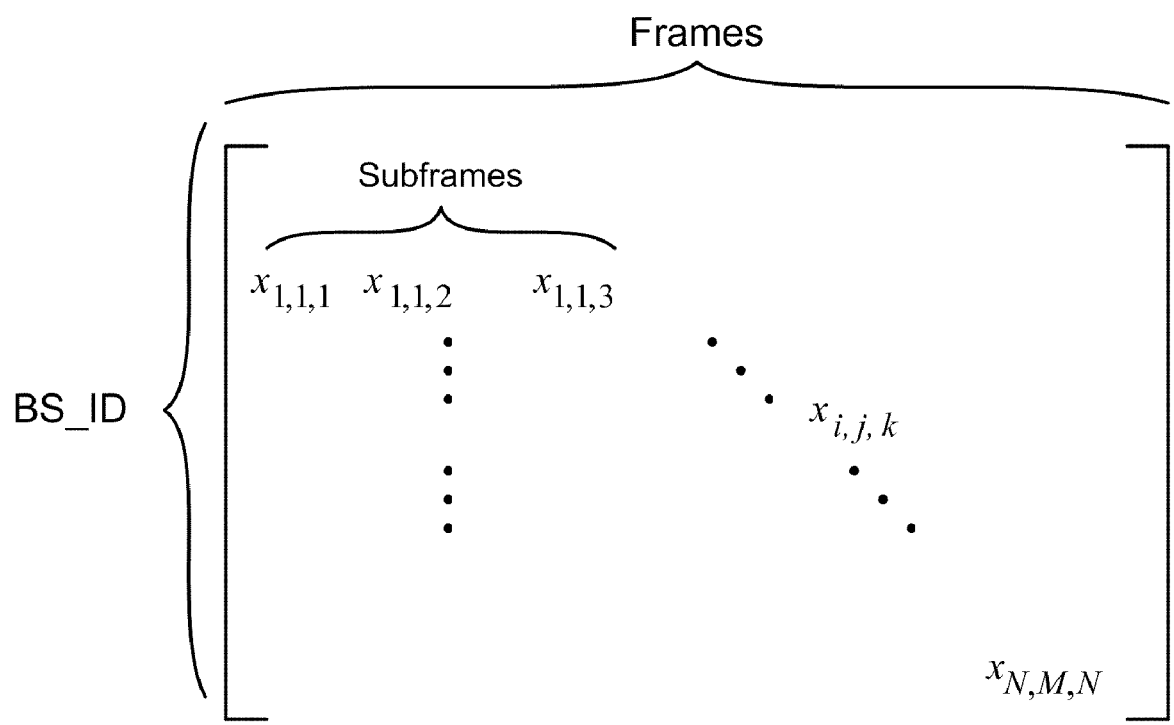
FIG. 4b illustrates a co-existence map for a superframe structure that includes frames of FIG. 4a, in accordance with an embodiment of the present invention.

As can be seen, base station A includes subscribers a1, a2, a3, and a4, and base station B includes subscribers b1, b2, and b3. Subscriber a4 is located within range of both base stations A and B. A subscriber can be, for example, a laptop, smartphone, personal or portable device, or other suitable customer premises equipment (CPE). Cells A and B can be, for example, a café and a neighboring library, respectively, or two neighboring business offices, or even two neighboring suburbs or cities. In any such cases, the base stations A and B each provide a wireless network that can be used to allow subscribers to interact with one another on a network and/or to access resources and/or the Internet. The need for coexistence arises, however, because each of base stations A and B operate on the same frequency or channel. As such, co-existence mode can be entered using the co-existence messaging techniques previously described, thereby enabling co-existence frames demonstrated by the pseudo code shown and explained in Table 1. As can be seen, the Frame Assignment Map routine is called when the Superframe Mode bit of SCH is set to logical 1 in this example embodiment. In addition, each of the base stations (BSs) that wish to share the channel and participate in the co-existence are assigned an identifier (ID) based on its MAC address (other suitable identifiers can be used as well, such as an SSID or random number). Up to 16 base stations may participate in this example (which is defined by the bit size of BS_Map). The co-existence map (Co_Existence_Map) array has a variable size depending upon the number of participating base stations and the number of frames within a superframe, as well as number of sub-frames within the frames as demonstrated in FIG. 4b and Table 1. FIG. 4b shows an example co-existence map array, which assumes the base station map (BS_MAP) is sixteen bits, thereby allowing for up to 16 unique base stations identifiers (BS_ID) to co-exist on and/or otherwise share the communication channel. As will be appreciated, the number 16 is used for the sake of illustration. The techniques described herein are scalable and any variable number of base stations can participate in this process of resource allocation.

TABLE 1

| Syntax | Size | Comment |
| --- | --- | --- |
| If Superframe_Mode = 1 { Frame_Assignment_MAP( ) { | | |
| BS_MAP | 16 bits | Base Station IDs (0 to 15) assigned in ascending order of their MAC IDs and referenced by the corresponding bits in the BS_MAP LSB to MSB. BS_MAP indicates which base stations will participate in the co-existence operation in the given Superframe. Value of 1 = BS with the corresponding ID will participate; value of 0 = BS with a corresponding ID will not participate. |
| Co_Existence_MAP | Variable | Bits are laid out column-wise (left to right followed by top to bottom) in a matrix. $N_C$ = Number of base stations participating in co-existence operation. $X_{i,j,k}$ = 0 indicates that BS i will not transmit in Frame j and Sub-frame k. $X_{i,j,k}$ = 1 indicates that BS i will transmit in Frame j and Sub-frame k. Wherein i = base station ID and j = frame number within the superframe and k = sub-frame number within the frame. |
| } } | | |

In more detail, once co-existence is negotiated between two (or more) cells, the cell that agrees to the co-existence schedules co-existence frames in the subsequent superframes. As is known, an IEEE 802.22 superframe includes 16 frames (e.g., 10 ms duration) and starts with the superframe preamble followed by the frame preamble and the superframe control header (SCH). The SCH is followed by the frame control header (FCH) of the first frame. The SCH format of the superframe can be configured accordingly to indicate co-existence mode is active (e.g., the Superframe Mode bit of SCH can be set to logical 0 for Normal Mode, or logical 1 for Co-existence Mode). The length in bytes of the information contained in the SCH can also be set as necessary. In addition, optional information elements can be transmitted with the SCH, including a Frame Assignment Map.

In one example embodiment of the present invention, a Frame Assignment Map information element is employed as As can be seen with reference to FIG. 5, the frames for each of the cells A and B each includes two downstream sub-frames (DS sub-frame 1 and DS sub-frame 2), an upstream sub-frame (US sub-frame), and a self co-existence window (SCW). Each DS sub-frame of this example embodiment includes a Frame Preamble, FCH, US-Maps and DS-Map, UCD and DCD, and zone data. Each US sub-frame of this example contains zone data, as well as space for allocating resources for contention based access that can be used for ranging, BW requests, and UCS notification. As previously explained, each DS sub-frame size can be variable depending upon various MAC Layer functionalities such as interference free scheduling, dynamic resource renting and offering, and adaptive on-demand channel contention. The US sub-frame of this example includes 7 symbols or higher.

In operation, during the co-existence frame, cell A sends out its DS sub-frame (designated DS sub-frame 1), which includes its preamble, control information, DS and US maps and zone data. The zones can be established, for example, based on geographic location of the subscribers associated with cell A. Using such location information, cell A performs time slot and sub-channel allocation so as to divide the working area of cell A into zones. In the example embodiment shown, there are three zones (Zone 1, Zone 2, and Zone 3). Other embodiments may have fewer or more zones, as will be apparent in light of this disclosure. Each subscriber is effectively assigned to a zone. In particular, subscribers a1 and a4 are located in zone 1, subscriber a2 is located in zone 2, and subscriber a3 is located in zone 3. The resource allocation in the DS and US directions is carried out depending upon the zones. In performing its resource allocation, cell A leaves enough room in the DS sub-frame portion of the frame to enable BS B to transmit its DS sub-frame (designated DS sub-frame 2).

In a similar fashion to cell A, cell B sends out its DS sub-frame (DS sub-frame 2) after cell A has sent its own (DS sub-frame 1). However, before sending its DS sub-frame, cell B decodes the DS and US maps originating from cell A and sends out its own DS sub-frame containing the preamble, DS-Map and US-Maps, control information and zone data, which may or may not coincide with those of cell A. Again in a similar fashion to cell A, cell B performs user time slot and sub-channel allocation to divide cell into its own zones as shown, using geographic location information associated with each of its subscribers. In the example embodiment shown, there are three zones (Zone 1, Zone 2, and Zone 3) for cell B. Each subscriber is assigned to a zone. In particular, subscriber b1 is located in zone 1, subscriber b2 is located in zone 2, and subscriber b3 is located in zone 3. Cell B assigns US zones such that the subscribers associated with it in the interference region between the two cells have allocations that defer from the US assignments carried out by cell A in the interference region. As a result, each subscriber associated with cell A as well as cell B can transmit its US sub-frame at the same time.

In one particular embodiment, the geographic location information is provided by the subscribers to the BS at the time of initiation of the connection. For instance, typical wireless terminals (subscribers) include on-board mechanisms to obtain their location through for example, a Global Positioning System (GPS) system. In absence of such on-board devices that can determine the location of the wireless terminals (subscribers), the BS may employ a variety of direction finding and triangulation routines to geolocate or otherwise estimate the approximate location of its subscribers. Still in other embodiments, the location data can be manually determined and provided (e.g., by subscribers, system administrator, and/or other suitable personnel capable of determining location data). In addition, one of more base stations participating in the co-existence may exchange their subscriber geographic location information (and any other pertinent subscriber information). In some embodiments, zone formation is assisted by the use of MIMO and AAS techniques.

The technique of sub-frame sharing is generally known (see, for example, the IEEE 802.16h standard, which is herein incorporated by reference in its entirety). However, such conventional sub-frame sharing techniques do not consider optimal usage of resources. For instance, in the frame structure defined by the IEEE 802.16h standard, there is only one downstream sub-frame and one upstream sub-frame per frame. Also, existing sub-frame sharing techniques are not geared towards co-existence amongst systems using cognitive radios, and they do not address issues such as QoS and other user demands. In accordance with embodiments of the present invention, optimal usage of resources is enabled because the sub-frame creation and sharing allows for multiple sub-frames in the downlink direction. In addition, the sub-frame creation and sharing can be accompanied by formation of zones based on the geographic location of the subscribers and their frequency allocation.

QoS requirements generally vary, depending on the target application. For instance, applications such as interactive gaming and Voice over Internet Protocol (VoIP) are not that bandwidth hungry (throughput requirement), but require strict guidelines on latency between packets. For instance, interactive gaming requires typically a throughput of 50 kilobits/second (kbps) but the packets need to have a latency (delay between the packet delivery) of less than 25 milliseconds (ms). VoIP packets require a throughput of 32-64 kbps, latency of less than 160 ms and jitter (variation in delay between the packet delivery) of less than 50 ms. Streaming media require a throughput from 5 kbps to 2 megabits/second (Mbps) with jitter of less than 100 ms. As can be seen, many applications require small amounts of data to be sent in a regular and timely fashion rather than large amounts of data to be sent less frequently.

These QoS requirements can be easily mapped onto the sub-frame and zone based structure described herein because of the finer granularity that such sub-frame and zone techniques provide. Sub-frames create partitions in time domain structure of the frames and zones create partition in the frequency and spatial domain frame structure resulting in interference avoidance. As can be seen in FIGS. 4a and 5, base stations A as well as B are able to communicate to their subscribers in each of the frames. Also all the subscribers are able to communicate to the BS in each of the frames. This means that if each frame occupies 10 mS (for example), then the latency between packets in this case is guaranteed to be 10 mS (which is less than required 25 mS), and therefore meeting the QoS requirements of applications such as interactive gaming and VoIP.

In known techniques, alternate frames are allocated to different cells. However, such techniques are associated with a number of problems. For instance, the delay/latency is likely to increase with the number of cells wanting to co-exist, resulting in QoS parameters not being satisfied. In short, allocating alternate but complete frames to various cells uses only two sub-frames (one DS and one US) per frame, no zones are created, and only the assigned BS and subscribers communicate in each frame, whereas others keep quiet. In contrast, an embodiment of the present invention allows multiple DS sub-frames and one or more US sub-frames per frame, employ zones, and BS and subscribers that can communicate in each frame are dynamic.

Figure 6A:
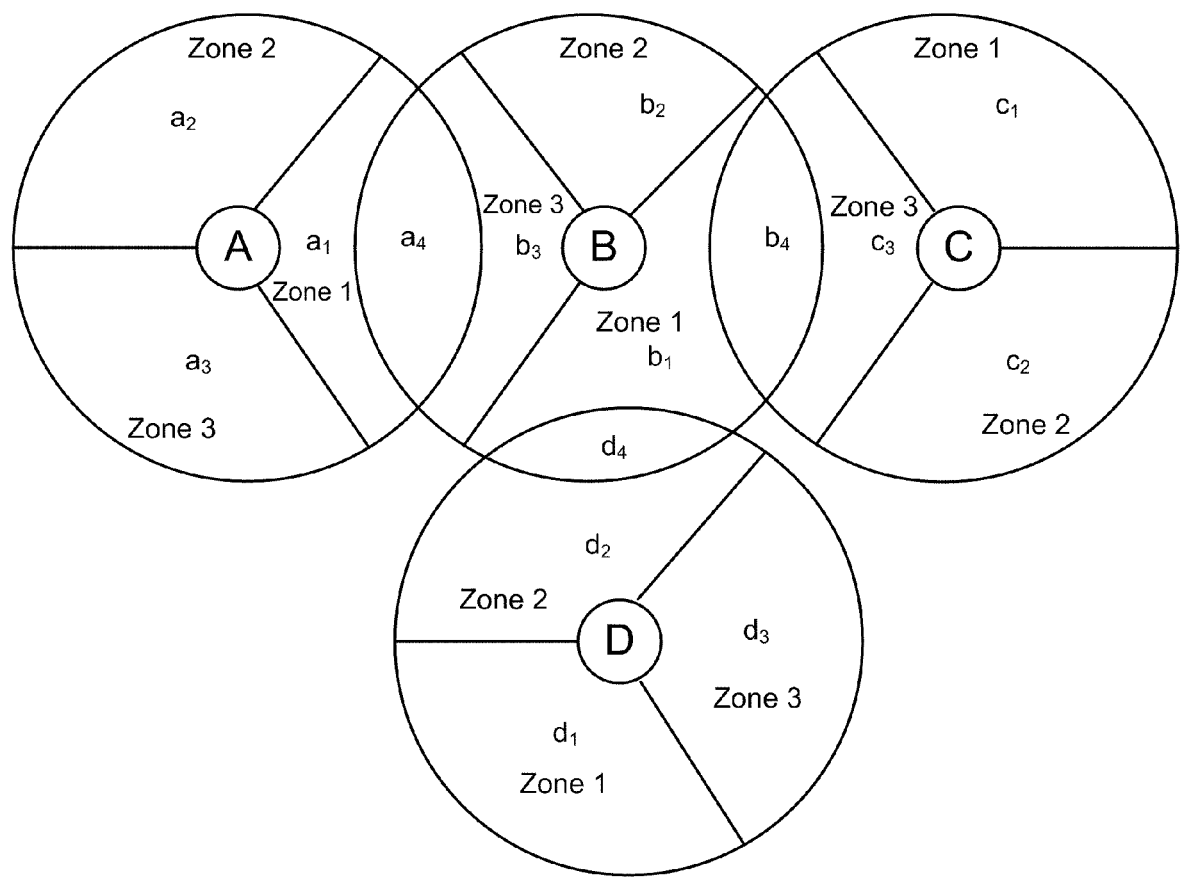
FIGS. 6a and 6b illustrate an example of sub-frame creation/sharing and zone formation for co-existence between more than two cells, in accordance with another embodiment of the present invention.
Figure 6B:
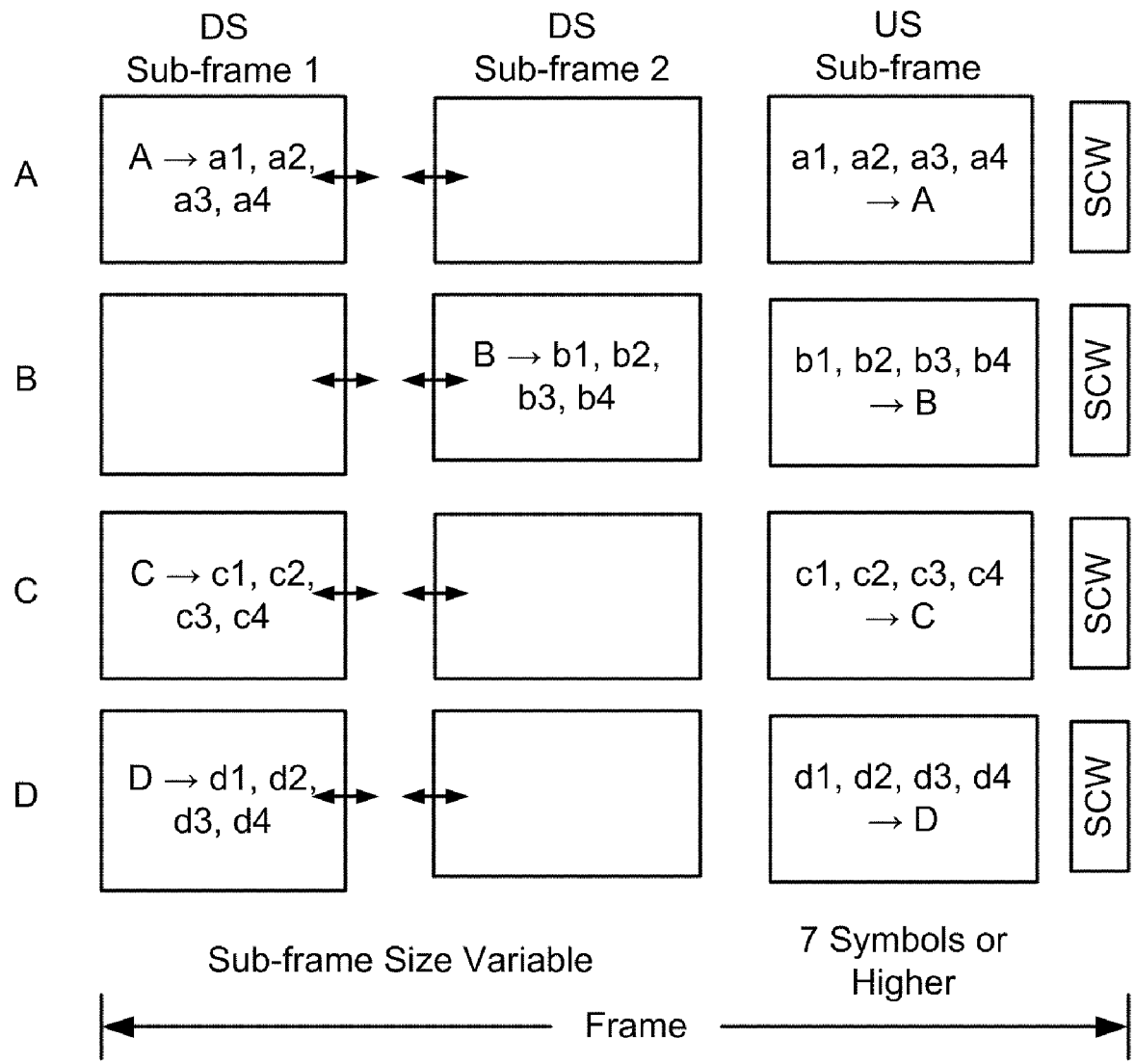

FIGS. 6a and 6b illustrate an example of sub-frame creation/sharing and zone formation for co-existence on the same channel between more than two cells, in accordance with another embodiment of the present invention. In this example, cell B needs to share its resources with neighboring cells A, C and D. This illustration further shows how QoS requirements will not be met as the number of cells requesting co-existence increases and if the sub-frame sharing and zone formation techniques described herein are not adopted.

In this example, the geographical location of A, C and D allow them to transmit information in the DS direction at the same time. As best shown in FIG. 6b, this is carried out in DS sub-frame 1 and indicated by in FIG. 6b by: A→a1, a2, a3, a4; C→c1, c2, c3, c4; and D→d1, d2, d3, d4. Cell B is assigned the DS sub-frame 2, in which base stations A, C and D keep quiet. This is indicated in FIG. 6b by B→b1, b2, b3, b4. In addition, due to the placement of zones, which creates partitions in the frequency domain in the US sub-frame structure, all the subscribers from all the zones are able to transmit at the same time. This has been indicated by in FIG. 6b as: a1, a2, a3, a4→A; b1, b2, b3, b4→B; c1, c2, c3, c4→C; and d1, d2, d3, d4→D. Without the provisioning of zones, then it would be possible that the US frequency allocations of subscribers in the neighboring cells may have overlapped, thereby creating interference.

Zone Rotation

Figure 7:
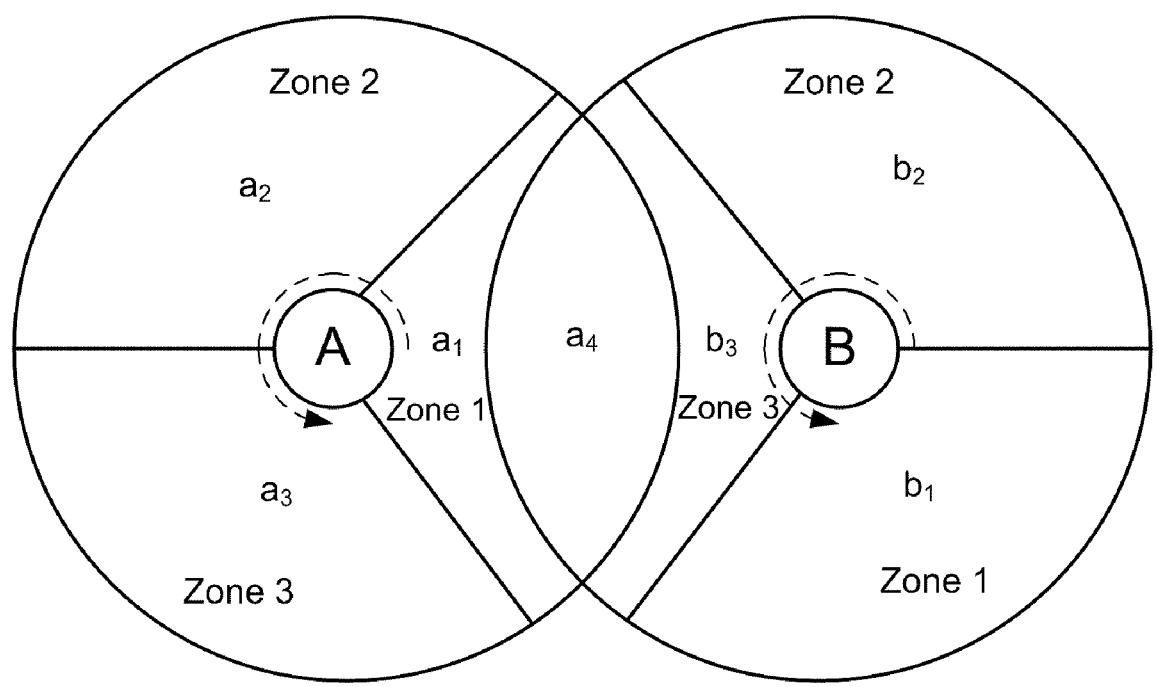
FIG. 7 illustrates zone rotation to achieve resource allocation diversity during co-existence mode and formation of control channels for co-existence information exchange, in accordance with an embodiment of the present invention.

FIG. 7 illustrates zone rotation to achieve resource allocation diversity during co-existence mode and formation of control channels for co-existence information exchange, in accordance with an embodiment of the present invention.

In particular, FIG. 7 shows how cell A and cell B follow the sector rotation policy within the subsequent frames of the co-existence frame in order to achieve diversity and create a periodic dedicated channel for information exchange between the cells. In general, a multipath wireless channel is frequency selective and hence there may be deep nulls at certain frequency locations. Hence, by rotating zones, which are logical sectors, it is possible to distribute the good and bad frequency portions of the spectrum equally between the users, thus creating diversity.

Also, zone rotation may be periodically used to enable information exchange between the two cells, where the BS from one cell transmits in a certain slot in the DS sub-frame (e.g., DS sub-frame # X) and the subscriber from the neighboring cell, tuned to the same zone receives this message. Similarly, a subscriber from the neighboring cell may transmit in a certain US zone to relay information back to the BS, thereby facilitating information exchange between the cells. This information exchange requires zone rotations where the DS and US zones of the two neighboring cells coincide.

As will be discussed in more detail with reference to FIG. 9, zone formation may also be used to assist mobility of the terminal from one cell to the other, resulting in a handover process. In such a case, the subscriber can remain on the same channel and decode information from two different cells on two different zones while making a transition.

Frame Structure

Figure 8A:
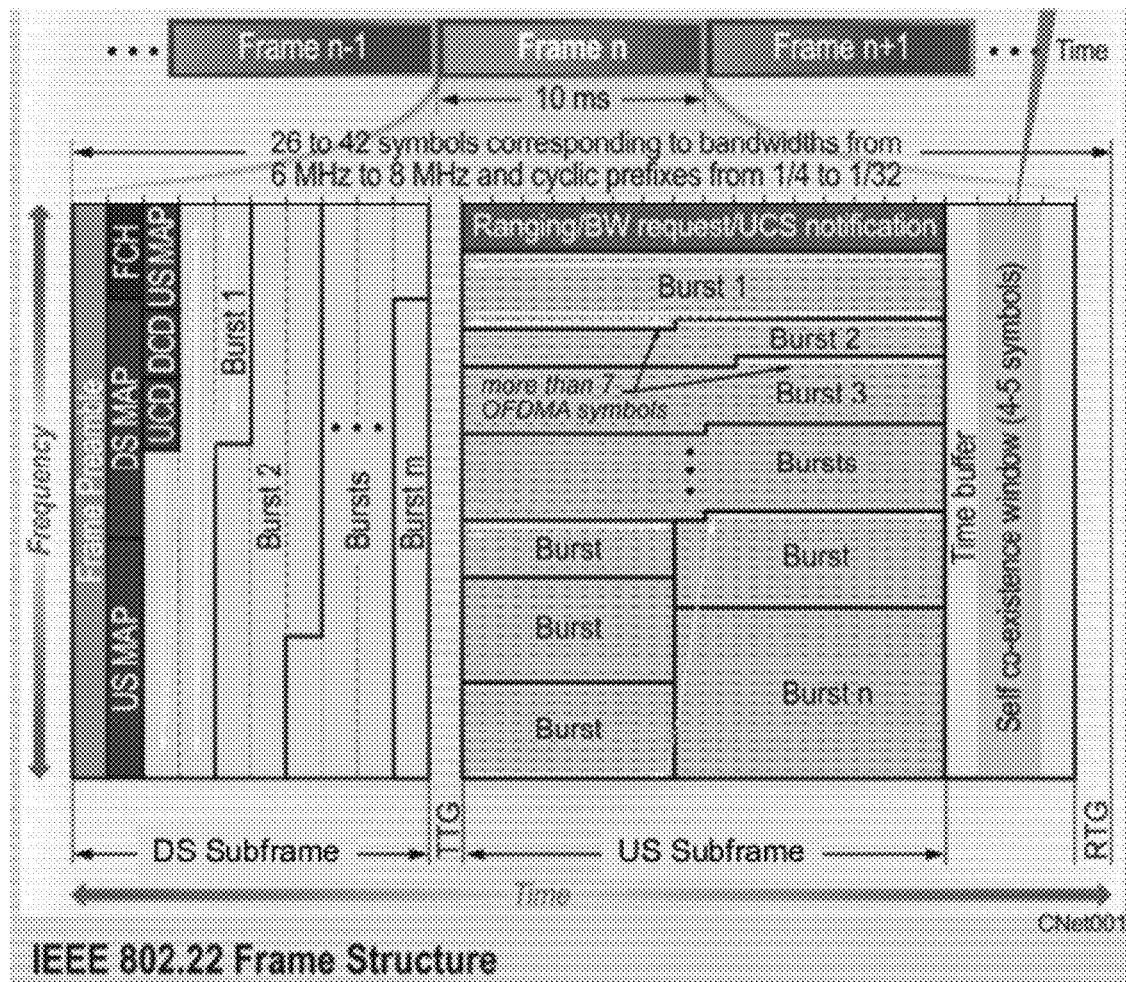
FIG. 8a illustrates a typical frame structure that can be used for downstream and upstream communications.

FIG. 8a shows the 802.22 frame structure, which includes DS and US sub-frames along with a self co-existence window (SCW). The SCW may be used for many tasks such as co-existence beaconing packet (CBP), also known as common beaconing protocol (CBP) transmission, inter and intra system synchronization, backhaul message passing, spectrum and WRAN sensing information exchange, channel sharing, interference free scheduling, dynamic resource renting and offering, and other desirable such functionalities.

Figure 8B:
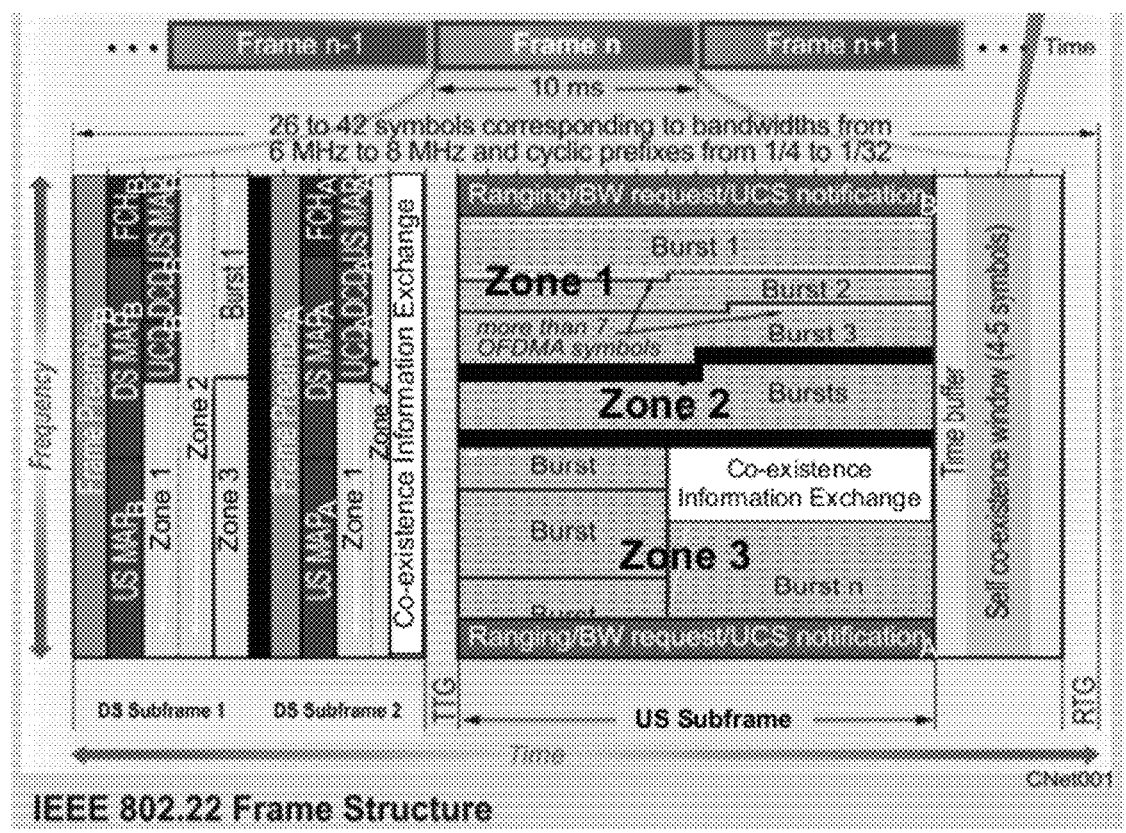
FIG. 8b illustrates that if cells are close enough to decode each others' information, then slots available in the downstream and upstream frame structure may be used to exchange the co-existence information, in accordance with an embodiment of the present invention.

FIG. 8b illustrates that, if cells are close enough to decode each others' information, then slots available in the downstream and upstream frame structure may be used to exchange the co-existence management, control and data information, in accordance with an embodiment of the present invention. This will help, for example, in utilizing the self co-existence window for intra-frame sensing for incumbent and WRAN discovery.

As can be seen in FIG. 8a, the SCW is normally quite small and used to exchange many different types of information. Hence if link budget is found to be suitable, then it is possible to relieve the burden on the SCWs, by using the regular DS and US slots (as best shown in FIG. 8b, in the slots designated for co-existence information exchange) to exchange some of the management, control and data information. This information exchange requires zone rotations as described herein, where the DS and US zones of the two neighboring cells coincide.

Also shown in FIG. 8b are two DS sub-frames (one for cell A and one for cell B), each DS sub-frame having a Frame Preamble, frame control header (FCH), upstream and downstream maps (US-Maps and DS-Map), uplink and downlink channel descriptors (UCD and DCD), and zone data, in accordance with one example embodiment. In addition, the US sub-frame shows zone data as well as space for allocating resources for contention based access that can be used for ranging, bandwidth (BW) requests, and urgent coexistence situation (UCS) notification. Variations on this sub-frame structure will be apparent in light of this disclosure.

Hand-Off Process

Figure 9:
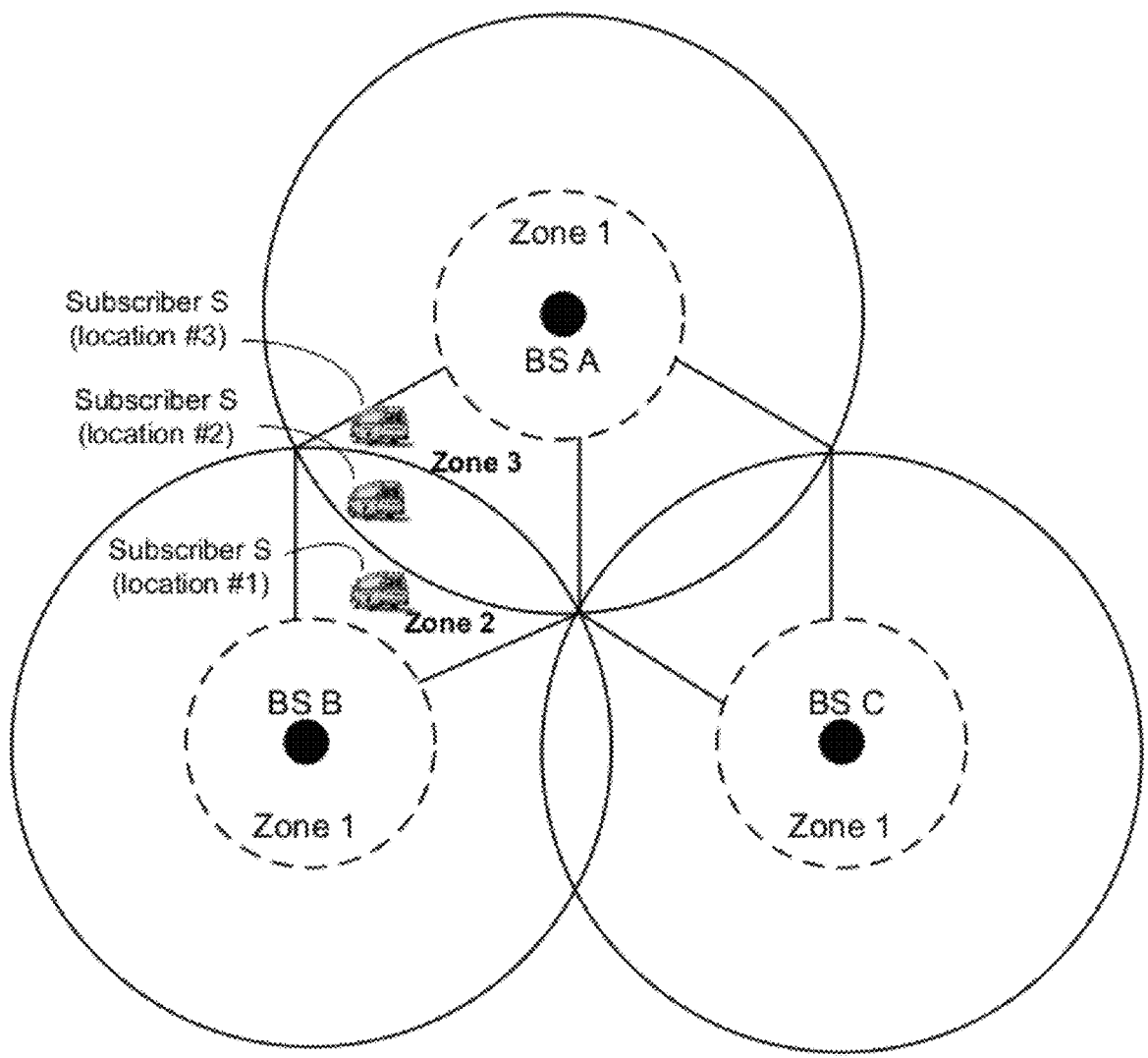
FIG. 9 shows how zone formation assists in situations where not many channels are available, and also shows how zone formation assists in the mobility of terminal and inter-cell hand-off, in accordance with an embodiment of the present invention.

FIG. 9 shows how zone formation assists in situations where not many channels are available, and also shows how zone formation assists in the mobility of the terminal and inter-cell hand-off, in accordance with an embodiment of the present invention. As can be seen, the figure depicts a situation where three neighboring cells need to share the same channel. Zones may be created such that Zones 1 in each of the cells are closer to the center and do not interfere. The subscribers on the cell boundary in the neighboring cells may be allocated different zones such that they share the same channel, but do not interfere.

FIG. 9 also shows how this process helps in the mobility of the terminal (subscriber) from one cell to the other without disruption in service. In particular, and in accordance with one embodiment, the subscriber wishing to move can remain on the same channel, but transmits and decodes the data in two zones belonging to two different base stations as the subscriber moves from one cell to the other, resulting in a soft hand-off process.

The hand-off or hand-over process allows the user to move from one cell to the other without losing the connectivity to the network. A hard hand-off process is a process where user looses connection from one cell before initiating the connection to the other cell. As such, a hard hand-off does not result in seamless handover. A soft hand-off on the other hand allows a subscriber to initiate a connection with a second cell while already being connected to the first cell, thereby resulting in two simultaneous connections (at least momentarily, until the hand-off process is complete). The subscriber then eventually drops one of the connections, resulting in a seamless handover.

Conventional techniques for mobility and hand-over require that the two cells supporting the hand-over operate on two different channels. Using these conventional techniques, the process of seamless hand-over (where there is no disruption in service for the user during the handover) in situations that require co-existence is difficult, if not impossible. However, due to the creation of zones as described herein, where the two zones from the two neighboring cells reside on the same channel, but do not interfere in space and/or the time and/or frequency domains, a seamless handover can be accomplished.

As can be seen with reference to FIG. 9, a subscriber S associated with base station (BS) B and zone 2 on the channel (assume channel X) needs to move from its location #1 to the cell covered by BS A operating on the same channel X. During the process of its mobility, the subscriber S can associate with BS A in Zone 3. Hence at location #2, for example, the subscriber S is simultaneously connected to BS B in Zone 2 and BS A in Zone 3. As the subscriber S moves further away from BS B (location #3), subscriber S looses the connectivity with BS B, but gets connected to BS A in Zone 3, thereby resulting in a seamless soft handover process.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A wireless communications system, comprising:
   a first base station for wirelessly communicating with one or more subscribers over a channel, the first base station configured to operate in a normal mode and a co-existence mode, and in response to entering the co-existence mode due to a second base station requesting access to the channel, the first base station is for transmitting a frame including first and second downstream (DS) sub-frames, an upstream (US) sub-frame, and a self-coexistence window; and
   the second base station, wherein the second base station is for wirelessly communicating with its subscribers over the channel, and is configured to operate in the normal mode and the co-existence mode, and in response to entering the co-existence mode due to the first base station requesting access to the channel, the second base station is for transmitting a frame including first and second DS sub-frames, an US sub-frame, and a self-coexistence window, wherein during the co-existence mode, the second base station communicates with its subscribers using the second DS sub-frame;
   wherein during the co-existence mode, sub-frame creation, sharing and zone formation schemes are implemented that enable an existing underlying frame structure to remain intact and inter-operable with legacy systems and at the same time provide a guaranteed quality of service (QoS), and the first base station communicates with its subscribers using the first DS sub-frame, thereby allowing the second base station to communicate with its subscribers using the second DS sub-frame.

2. The system of claim 1 wherein each of the DS sub-frames includes a preamble, control information, DS and US maps, and data.

3. The system of claim 1 wherein the first base station defines a cell within which its subscribers are located, and the first base station is further configured for establishing zones within that cell based on geographic location of those subscribers, such that each subscriber is assigned to a zone.

4. The system of claim 3 wherein the first base station uses the geographic location of those subscribers to perform time slot and sub-channel allocation so as to divide the working area of the cell into the zones.

5. The system of claim 3 wherein zone formation is used to assist mobility of a subscriber from one cell to another resulting in a hand-over process.

6. The system of claim 1 wherein before sending the second DS sub-frame, the second base station decodes DS and US maps originating from the first base station and sends out its own DS sub-frame including preamble, DS and US maps, control information and zone data, which may or may not coincide with those of the first base station.

7. The system of claim 1 wherein each subscriber associated with the first and second base stations can transmit its US sub-frame at the same time.

8. The system of claim 1 wherein the system initially attempts to resolve channel selection issues with neighboring base stations based on spectrum etiquette during the normal mode.

9. The system of claim 8 wherein in response to channel selection not being resolved using spectrum etiquette, then the system enters the co-existence mode of operation.

10. The system of claim 1 wherein the co-existence mode is utilized when one or more of interference free scheduling, dynamic resource renting and offering, or contention is required for resource sharing.

11. The system of claim 1 wherein in the co-existence mode, channel bandwidth and frame structure is divided into zones of space, time and sub-channels.

12. The system of claim 11 wherein the zones rotate in accordance with a clockwise or counter-clockwise rotation policy, so as to achieve at least one of diversity and control message passing.

13. The system of claim 1 further comprising a third base station, wherein the third base station is a legacy base station not configured for transmitting a frame including first and second DS sub-frames.

14. A wireless communications system, comprising:
   a first base station for wirelessly communicating with one or more subscribers over a channel, the first base station configured to operate in a normal mode and a co-existence mode;
   a second base station for wirelessly communicating with one or more subscribers over the channel, the second base station configured to operate in the normal mode and the co-existence mode;
   wherein in response to entering the co-existence mode due to the second base station requesting access to the channel, the first base station is for transmitting a frame including first and second downstream (DS) sub-frames, an upstream (US) sub-frame, and a self-coexistence window, and during the co-existence mode, the first base station communicates with its subscribers using the first DS sub-frame, and the second base station communicates with its subscribers using the second DS sub-frame, and in the co-existence mode, sub-frame creation, sharing and zone formation schemes are implemented that enable an existing underlying frame structure to remain intact and inter-operable with legacy systems and at the same time provide a guaranteed quality of service (QoS); and
   wherein the system initially attempts to resolve channel selection issues with neighboring base stations based on spectrum etiquette during the normal mode, and in response to channel selection not being resolved using spectrum etiquette, then the system enters the co-existence mode of operation.

15. The system of claim 14 wherein before sending the second DS sub-frame, the second base station decodes DS and US maps originating from the first base station and sends out its own DS sub-frame including preamble, DS and US maps, control information and zone data, which may or may not coincide with those of the first base station.

16. The system of claim 14 wherein each subscriber associated with the first and second base stations can transmit its US sub-frame at the same time.

17. The system of claim 14 wherein the co-existence mode is utilized when one or more of interference free scheduling, dynamic resource renting and offering, or contention is required for resource sharing.

18. The system of claim 14 wherein in the co-existence mode, channel bandwidth and frame structure is divided into zones of space, time and sub-channels, and the zones rotate in accordance with a clockwise or counter-clockwise rotation policy, so as to achieve diversity and/or control message passing.

19. A wireless communications system, comprising:

a first base station for wirelessly communicating with one or more subscribers over a channel, the first base station configured to operate in a normal mode and a co-existence mode, and in response to entering the co-existence mode due to a second base station requesting access to the channel, the first base station is for transmitting a frame including first and second downstream (DS) sub-frames, an upstream (US) sub-frame, and a self-coexistence window;

wherein during the co-existence mode, the first base station communicates with its subscribers using the first DS sub-frame, thereby allowing the second base station to communicate with its subscribers using the second DS sub-frame, and each of the DS sub-frames includes a preamble, control information, DS and US maps, and data, and in the co-existence mode, sub-frame creation, sharing and zone formation schemes are implemented that enable an existing underlying frame structure to remain intact and inter-operable with legacy systems and at the same time provide a guaranteed quality of service (QoS); and wherein the first base station defines a cell within which its subscribers are located, and the first base station is further configured for establishing zones within that cell based on geographic location of those subscribers, such that each subscriber is assigned to a zone;

wherein the system initially attempts to resolve channel selection issues with neighboring base stations based on spectrum etiquette during the normal mode, and in response to channel selection not being resolved using spectrum etiquette, then the system enters the co-existence mode of operation, and the co-existence mode is utilized when one or more of interference free scheduling, dynamic resource renting and offering, or contention is required for resource sharing.

* * * * *